United States Patent [19]

Youn et al.

[11] Patent Number: 4,960,812

[45] Date of Patent: Oct. 2, 1990

[54] POLYESTER RESIN COMPOUND

[75] Inventors: Han S. Youn; Kim Dong, II; Choi I. Gyu, all of Jeonju, Rep. of Korea

[73] Assignee: Sam Yang Co., Ltd., Seoul, Rep. of Korea

[21] Appl. No.: 265,236

[22] Filed: Oct. 31, 1988

[30] Foreign Application Priority Data

Nov. 20, 1987 [KR] Rep. of Korea .......................... 13100

[51] Int. Cl.$^5$ .......................... C08L 67/02; C08K 5/09
[52] U.S. Cl. .................................... 524/291; 524/292; 524/327; 524/539; 524/605
[58] Field of Search ............... 524/605, 539, 291, 292, 524/327

[56] References Cited

U.S. PATENT DOCUMENTS 4,368,288 1/1983 Nield .................................... 524/539
4,486,561 12/1984 Chung .................................. 524/605

FOREIGN PATENT DOCUMENTS 088286 9/1983 European Pat. Off. .
073761 4/1986 Japan .
078862 4/1986 Japan .
119265 5/1987 Japan .

*Primary Examiner*—Melvyn I. Marquis
*Assistant Examiner*—David Buttner
*Attorney, Agent, or Firm*—Lieberman, Rudolph & Nowak

[57] ABSTRACT

Polyester resin compounds useful as plastic materials which demonstrate good surface characteristics, excellent physical properties and outstanding formability, particularly when processed at a temperature lower than 100° C. are disclosed. Superior characteristics are achieved by accelerating the speed of crystallization thereof by incorporating additives so that crystallization is completed throughout the product.

1 Claim, No Drawings

POLYESTER RESIN COMPOUND

BACKGROUND OF THE INVENTION

The present invention relates generally to polyester compounds useful as plastic materials, especially polyethyleneterphthalate (hereinafter referred to as "PET") resins having good dimensional stability, excellent plasticity and a high degree of crystallization.

More particularly, the present invention encompasses PET resin compounds possessing good surface characteristics and physical properties as well as outstanding mold release properties when shaped even at a temperature of under 100° C.

In conventional practice, PET is generally used for industrial purposes, for example, as a film fiber, due to its unique physical and electrical properties, its excellent thermal resistance and resistance to chemical degradation.

However, to be utilised in industrial fields requiring special type of crystallization, such as plastic processing, PET demonstrates peculiar crystallizing action during the process. Although PET is a crystalline polymer, several problems occur when it is used in plastic processes as a general thermoplastic resin with a metal mold temperature of under 100° C. A high second order transition temperature causes the final molded product to have very low shape stability and to exhibit poor mold release properties. Long hours of operation are required to use PET resins in connection with metal molds. Undesirable stripe patterns or sink marks also typically appear on the product.

To solve the above described problems, Applicants have discovered that the temperature of initiating PET crystallization should be lowered and, at the same time, the speed of crystallization accelerated so that crystallization can be completed rapidly.

To speed up crystallization during processing at low temperature, certain inorganic substances are utilized. Talc, titanium dioxide, mica and magnesium oxide were introduced for such purposes in U.S. Pat. Nos. 3,368,975 and 3,575,931. Epoxy compounds were used as the accelerant for crystallization of organic substances in U.S. Pat. Nos. 4,276,208, 4,215,032 4,141,882 and Korean Pat. Publication Nos. 83-856 and 83-973. U.S. Pat. No. 4,366,273, British Pat. No. 2,075,301 and Korean Pat. Publication No. 81-1801, disclose the use of compounds including hydrocarbon metallic salts and unsaturated hydrocarbon polymer metallic salts containing carboxyl groups.

With respect to the inorganic substances described above, the effects, such as the formation of crystal nuclei, differ depending upon the distribution of particle-diameters and uniformity of dispersion. Desirable effects are not easily obtained even by increasing the quantity thereof.

The temperature under which crystallization is initiated is not easily lowered, and the crystallizing state of the surface of the final product processed at low temperature with a metal mold is normally in bad condition.

Where utilizing epoxy compounds as the expeditor of crystallization of organic substances, the physical properties of the organic compounds are not maintained. In the case of hydrocarbon polymer metallic salts, the plasticity deteriorates.

SUMMARY OF THE INVENTION

In view of the foregoing, one object of the present invention is to provide a PET compound which even during plastic processing at low temperatures, enables high speed, uniformity, an acceptable degree of crystallization, outstanding plasticity as well as other physical properties.

In accordance with the present invention, a PET resin is disclosed having a specific viscosity of 0.4–1.0 dl/gr (measured at 25° C. after dissolving 0.5% by weight of polymer in a mixture of phenol and tetrachloroethane at a ratio of 1:1 by weight), mixed with compounds I through IV below:

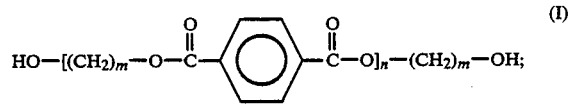

wherein each m is independently 2 or 4, and n is an integer of from 1 to 100, and

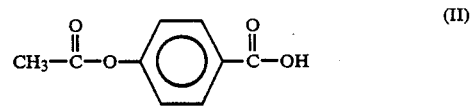

where 0.05 to 30% by weight of the co-polyester is obtained by the polycondensation of compounds (I) and (II) under a mole ratio..of compound (II)/compound (I) from 20/80 to 80/20;

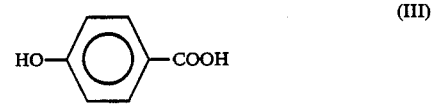

and

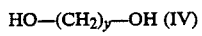

or M—(OH)$_x$ where M is a mono or dihydric and X is 1 or 2;
where y is an integer of from 2 to 10,
such that 0.01 to 10% by weight of the metallic or diol salt of parahydroxybenzoic acid is obtained from blending compound (III) and (IV) in a mole ratio of 1:1, and blending therein:

inorganic fillers such as talc, titanium dioxide, calcium carbonate and kaolinite,
and an activator such as sodium stearate, magnesium stearate or neopentyl glycol dibenzoate to accelerate the speed of crystallization of the polyester.

The above substances may be added at the melting point, after the polymerization of polyester, or alternatively during the compounding process by which the physical properties and incombustibility of polyester are improved.

With respect to the present invention, the resin compound may be supplemented with a fiber reinforcement, such as glass fiber, carbon fiber or cabulla fiber to improve the physical properties and bromic or chloric flame-retardant compounds may be added to enhance incombustibility. The fiber reinforcement is desirably processed with silane or boron to improve its adhesion with the polymer.

Other substances may also be added, such as coloring agents, antioxidants or formation enhancing materials.

The composition according to present invention, which is ready for plastic processing, contains a high degree of crystallization even under general plastic processing conditions and possesses good dimensional stability and physical properties.

Thus, the compounds are widely useful for plastic production processes to form sheet materials, decorative products, receptacles and laminated products and are also suitable for electric, electronic, and car-related components, based upon the unique electrical properties exhibited thereby.

The following examples falling within the scope of the present invention use units indicated as percentages on a weight basis, without being specified units in each instance. Evaluations were made according to the following methods:

(1) Polymerization A reactor made of stainless steel with a large capacity is agitated under vacuum.

(2) Compounding of polymer and additives Polymers and additives are automatically blended under certain ratios in the compounder. The temperature in the cylinder is maintained at 260°–280° C. The compound is cut into chips after being passed through a cooler.

(3) Plastic process of specimen
(A) Drying of chips Drying is conducted for 4 hours at 160° C. by a dehumidifying drier, so that the moisture ratio is lowered to under 0.01% by weight.
(B) Plastic process of specimens Dried chips are shaped into a trial-piece (127×12.7×1.6 mm) by an injection molding machine under the following conditions:
Temperature in cylinder : 280° C.
Temperature of metal mold : 40°±2° C.
Pressure conserving time of injection: 15 seconds
Cooling time: 15 seconds
Pressure of injection: 600–1000 kg/cm$^2$ (4) Surface characteristics of the molded article The surface state of the trial-piece which has undergone injection molding is visually examined.

(5) Mold release properties of molded article. Release from the mold is evaluated. The number of specimens out of 50 trial injections that do not attach to the metal mold after processing is determined.

(6) Evaluation of heat properties. The temperature of crystallization, appearing with heating at 20° C./min up to 280° C. by Differential Scanning Calorimetry Analysis (hereinafter referred to as "DSCA") is represented by Tch. The temperature of crystallization with cooling under 30° C./min is represented by Tcc.
(A) The difference between Tch, obtained from the original Polymer, and that from the polymer of the present invention is indicated as ΔTch. It is understood that the greater ΔTch is, the more effective the plastic processing is at low temperature.
(B) The initial degree of crystallization at 40° C. (hereinafter referred to as "IDC 40") is represented by ΔHTcc-ΔHTch/ΔHTcc. The IDC 40 of the polymer for plastic processing should be over 0.75.

(7) Remarks for the tables
A.A: Co-polyester of m=2 in above compound (I)
A.B: Co-polyester of m=4 in compound (I)
B.A: Metallic salt of M.OH in compound (IV)
B.B: Diol salt of y=2 in compound (IV)
B.C: Diol salt of y=4 in compound (IV)
C.: Talc
D.: Metallic salt of stearic acid
E.: Neopentyl glycol dibenzoate
XX: Glass fiber of Asahi Fiber Glass
XY: Bromic flame-retardant or synergist for flame retardance For a better understanding, the present invention is described in connection with the following non-limiting examples. The results are shown in tables 1 and 2 below.

EXAMPLE 1

5950 g of PET resin containing a viscosity of 0.65 dl/g and additives according to present invention, 50 g of co-polyester (A.A), 20 g of metallic salt of Parahydroxybenzoic acid (B.A), 30 g of Talc, 30 g of sodium stearate, 20 g of Neopentyl glycol dibenzoate, 3000 g of Asahi Fiber Glass reinforcement fiber and 900 g of Bromic flame retardant are successively blended, cooled, pelleted and shaped into specimens (127 mm×17.7 mm×1.6 mm). The surface condition and mold release properties of the samples are evaluated as described above, and the heat behavior is evaluated by DSCA. The results are shown below in Tables 1 and 2.

EXAMPLES 2–6

The method described in Example 1 is adopted, except the composition of additives is modified as indicated below in Table 1, and the results of testing are shown in Table 2.

COMPARATIVE EXAMPLE 1

No additive is included, but reinforcement and flame-retardancy are evaluated.

COMPARATIVE EXAMPLE 2–5

Other additives than those according to the present invention, such as Talc, sodium stearate and Neopentyl glycol dibenzoate are added.

COMPARATIVE EXAMPLES 6–7

Co-polyester, one of the additives according to the present invention, and other additives of comparative examples 2–5 are included.

TABLE 1

| | Compositions according to Examples and Comparative Examples | | | | |
|---|---|---|---|---|---|
| | compound A | compound B | additives | reinforcement | flame-retardant |
| Com. Ex. 1 | — | — | — | XX (30.0) | XY (9.0) |
| Com. Ex. 2 | — | — | C (5.0) | XX (30.0) | XY (9.0) |
| Com. Ex. 3 | — | — | D (0.5) | XX (30.0) | YY (9.0) |
| Com. Ex. 4 | — | — | E (0.5) | XX (30.0) | YY (9.0) |
| Com. Ex. 5 | — | — | C (0.5) | XX (30.0) | YY (9.0) |

TABLE 1-continued

| | Compositions according to Examples and Comparative Examples | | | | |
|---|---|---|---|---|---|
| | compound A | compound B | additives | reinforcement | flame-retardant |
| Com. Ex. 6 | A.A (1.0) | — | D (0.5) E (0.5) C (0.5) | XX (30.0) | YY (9.0) |
| Com. Ex. 7 | A.B (1.0) | — | D (0.3) D (0.2) C (0.5) | XX (30.0) | YY (9.0) |
| Example 1 | A.A (0.5) | B.A (0.2) | D (0.3) E (0.2) C (0.3) D (0.3) | XX (30.0) | YY (9.0) |
| Example 2 | A.B (0.5) | B.A (0.2) | E (0.2) C (0.3) D (0.3) | XX (30.0) | YY (9.0) |
| Example 3 | A.A (0.5) | B.B (0.2) | E (0.2) C (0.3) D (0.3) | XX (30.0) | YY (9.0) |
| Example 4 | A.B (0.5) | B.B (0.2) | E (0.2) C (0.3) D (0.3) | XX (30.0) | YY (9.0) |
| Example 5 | A.A (0.5) | B.C (0.2) | E (0.2) C (0.3) D (0.3) | XX (30.0) | YY (9.0) |
| Example 6 | A.B (0.5) | B.C (0.2) | E (0.2) C (0.3) D (0.3) E (0.2) | XX (30.0) | YY (9.0) |

TABLE 2

| | Results as per the compositions of Examples and Comparative Examples | | | | |
|---|---|---|---|---|---|
| Result division | IDC 40 | (°C.) Tch | (Sec) cycle Time | (number) Mold Release property | Surface state |
| Com. Ex. 1 | 0.25 | 0 | 15 | 0 | sink mark |
| Com. Ex. 2 | 0.38 | 5 | 15 | 33 | sink mark |
| Com. Ex. 3 | 0.51 | 12 | 15 | 21 | sink mark |
| Com. Ex. 4 | 0.40 | 10 | 15 | 24 | sink mark |
| Com. Ex. 5 | 0.53 | 13 | 15 | 30 | sink mark |
| Com. Ex. 6 | 0.66 | 20 | 15 | 50 | good |
| Com. Ex. 7 | 0.70 | 18 | 15 | 50 | good |
| Example 1 | 0.86 | 28 | 15 | 50 | excellent |
| Example 2 | 0.81 | 26 | 15 | 50 | excellent |
| Example 3 | 0.78 | 26 | 15 | 50 | excellent |
| Example 4 | 0.90 | 24 | 15 | 50 | excellent |
| Example 5 | 0.82 | 27 | 15 | 50 | excellent |
| Example 6 | 0.82 | 24 | 15 | 50 | excellent |

I claim:

1. A polyester resin comprising a polyethylene terephthalate resin with a viscosity of 0.4–1.0 dl/g, combined with:
   (i) from about 0.5% to about 30% by weight of a co-polyester obtained from a polycondensation of a compound having the structure:

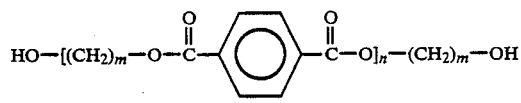

wherein m is independently 2 or 4, and n is an integer of from 1 to 100, and a compound having the structure:

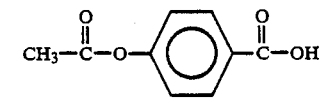

combined in a molar ratio of from about 20/80 to about 80/20;
   (ii) from about 0.01% to about 10% by weight of a metal salt or diol salt of p-hydroxybenzoic acid;
   (iii) about 0.15% by weight of an inorganic filler selected from the group consisting of talc, titanium dioxide, calcium carbonate, and mica;
   (iv) from about 0.1% to about 15% by weight of a lubricant selected from the group consisting of sodium stearte, magnesium stearate and neopentylglycol dibenzoate;
   (v) from about 5% to about 50% by weight of a reinforcing glass fiber; and
   (vi) from about 5% to about 30% by weight of a flame retardant.

* * * * *